April 16, 1963 E. H. PAUFVE 3,085,646
MOTOR VEHICLE CONTROL SYSTEM
Filed July 25, 1960 3 Sheets-Sheet 1
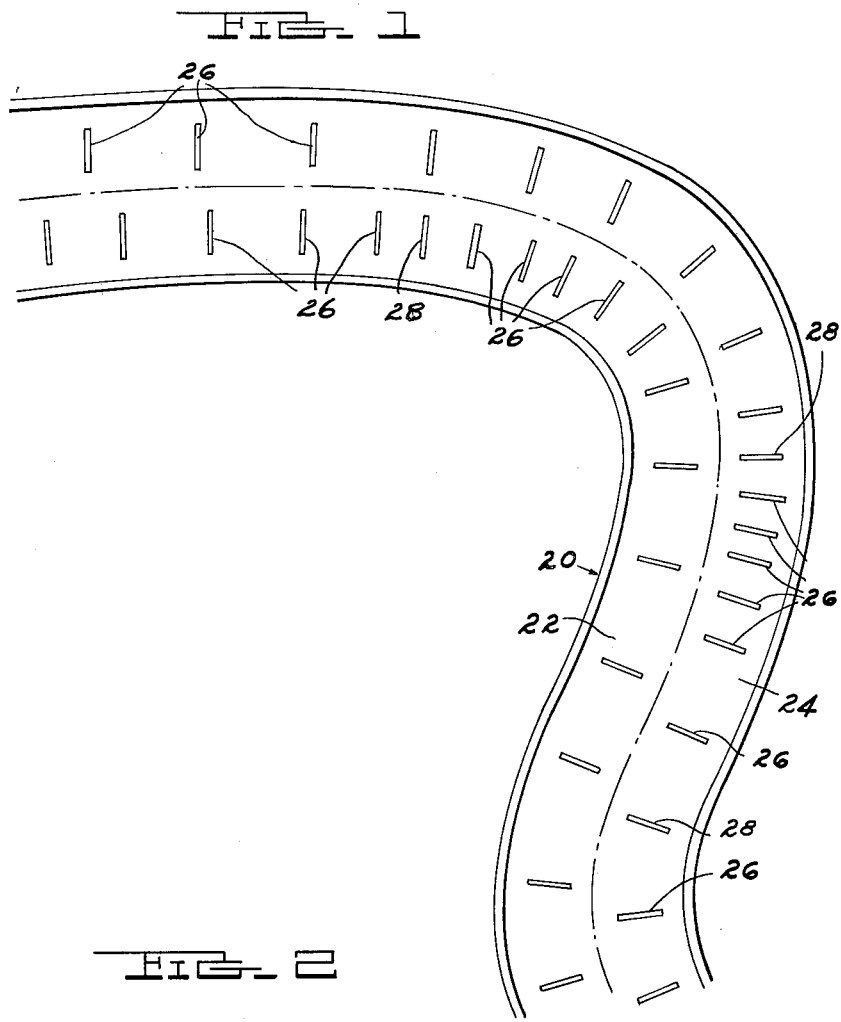
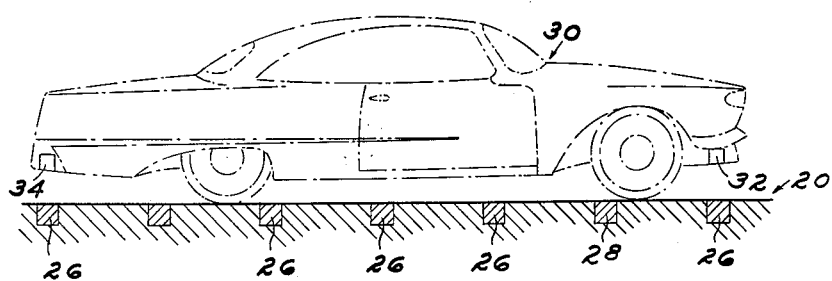
INVENTOR.
ELDRED H. PAUFVE
BY
*Richard J. Seeger*
ATTORNEY April 16, 1963  E. H. PAUFVE  3,085,646
MOTOR VEHICLE CONTROL SYSTEM
Filed July 25, 1960  3 Sheets-Sheet 2

INVENTOR.
ELDRED H. PAUFVE
BY
Richard J. Seeger
ATTORNEY

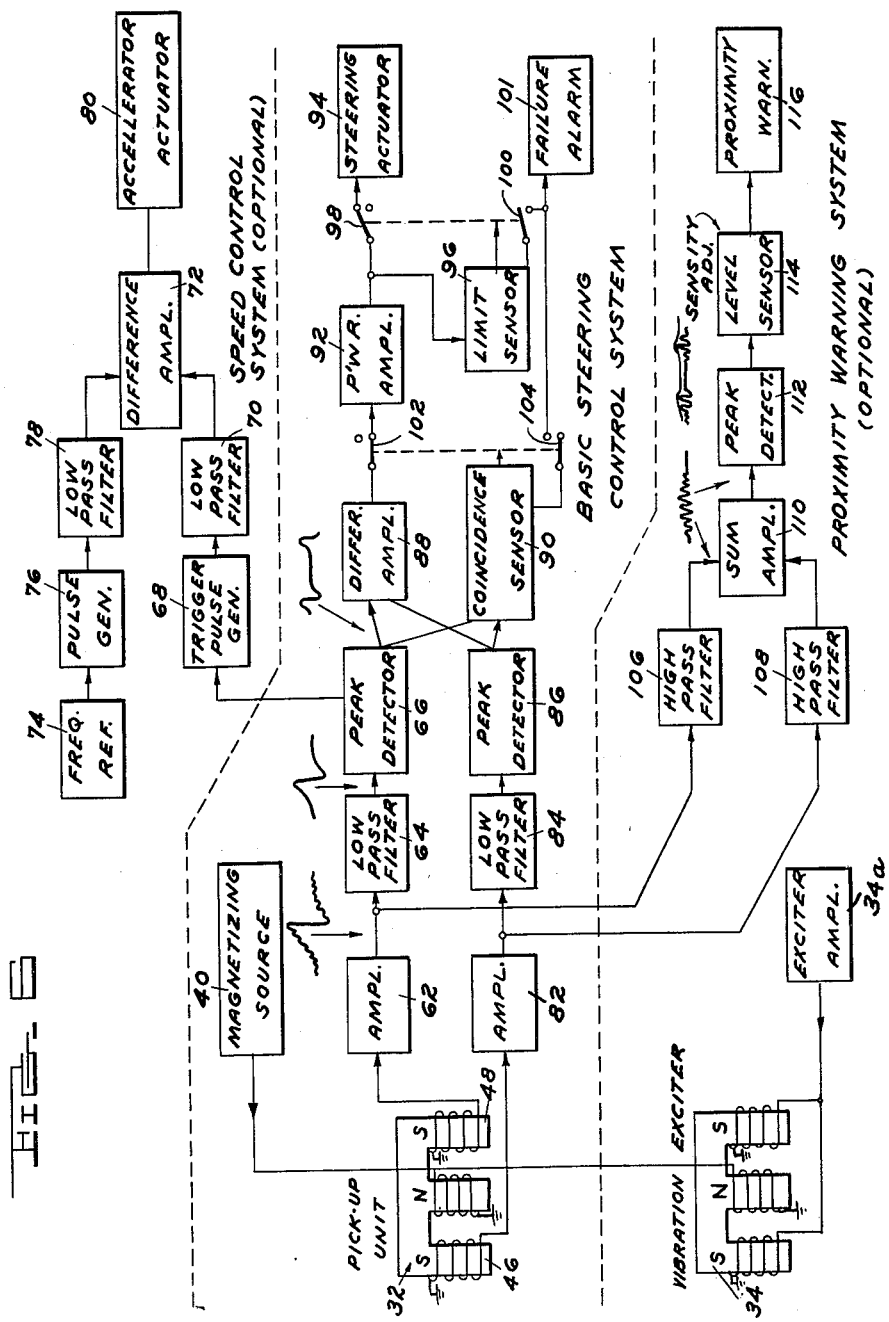

United States Patent Office 3,085,646
Patented Apr. 16, 1963

3,085,646
MOTOR VEHICLE CONTROL SYSTEM
Eldred H. Paufve, Binghamton, N.Y., assignor to The Bendix Corporation, Southfield, Mich., a corporation of Delaware
Filed July 25, 1960, Ser. No. 45,138
9 Claims. (Cl. 180—82.1)

This invention pertains to a motor vehicle control system to control the direction and speed of the vehicle, and, more particularly, to a system having individual magnetic bars or strips spaced along the center of a vehicle lane, with magnetic sensors being placed on each vehicle to detect the lateral position of the vehicle with respect to the row of magnetic strips to allow directing of the vehicle along the lane and means to sense the frequency of passing over the magnetic strips, with the strips being spaced to control vehicle speed.

It is an essential object of this invention to provide a system of vehicle control having individual magnetic bars or strips placed along the center of a vehicle lane with means such as a differential transformer, being placed in the vehicle which can sense the relative position of the magnetic materials by providing a pair of magnetic field paths directed toward the lane surface, with each path utilizing a portion of the magnetic strip to reduce its reluctance when the vehicle is over a strip. Means are used to sense and compare the relative reluctance in the paths to produce a signal which steers the vehicle so that the path reluctances are kept equal and vehicle stays centered over the strips. Also, since the magnetic flux in the differential transformer increases each time the vehicle passes over a magnetic strip to produce an alternating voltage output, vehicle speed may be controlled by spacing the magnetic strips as desired and providing means to control the vehicle speed so that the frequency with which the vehicle passes over the strip is constant.

It is an object of this invention to provide a system for indicating the proximity of two vehicles by placing on the center of a lane in a road a plurality of individual mechanically resonant magnetic materials such as magnetostrictive elements and placing near the rear end of each vehicle an exciting magnet to cause fluctuation of said magnetostrictive materials and placing near the front end of each vehicle means for sensing the fluctuations with the degree of fluctuation indicating the nearness of a preceding vehicle.

These and other objects and advantages will become more apparent when preferred embodiments of this invention are considered in connection with the drawings in which:

FIGURE 1 is a schematic plan view of a two lane roadway each of which has attached along the center thereof a series of variable spaced magnetic strips;

FIGURE 2 is an elevational view of an automobile traveling over one of the lanes in FIGURE 1;

FIGURE 6 shows a partially schematic block diagram of the comparator used with differential transformer and the exciter used for the magnetostrictive material.

In FIGURE 1 the roadway 20 has lanes 22, 24, with strips of magnetic material 26 being spaced along the center lines of each of the lanes 22, 24 with each strip being laid transverse to the center line. Strips 26 are of a ferromagnetic material and in this embodiment are approximately 1" x 8" by a few mills thick and could be attached to the surface of the existing roadways or embedded in new roadways. The strips are variably spaced according to the desired speed of the vehicle so that near curves or turnoff points the strips are close together, resulting in slower vehicle speeds, while on straightaways the strips are farther apart, resulting in increased vehicle speeds. The manner in which this is accomplished will be described later.

Figure 5:
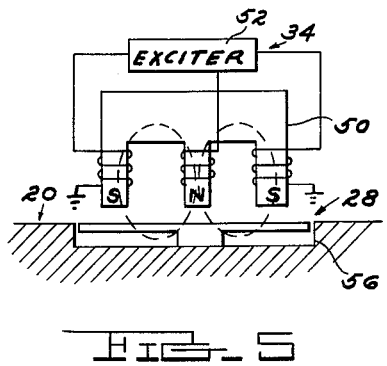
FIGURE 5 is a view in cross section of a magnetostrictive material in the roadway with a schematic view of means for exciting the magnetostrictive material.
Figure 5A:
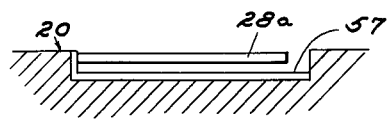
FIGURE 5A shows a second embodiment of a magnetostrictive material in cross section.
Figure 5B:
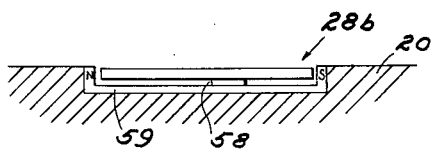
FIGURE 5B shows a further embodiment in cross section of a magnetostrictive element.

Periodically along each lane the ferromagnetic strips 26 are replaced with the mechanically resonant element such as magnetostrictive elements 28 which may take the form of those shown in FIGURES 5, 5A and 5B. These are used for proximity warning to indicate whether a preceding vehicle is dangerously near as will later be described.

Figure 3:
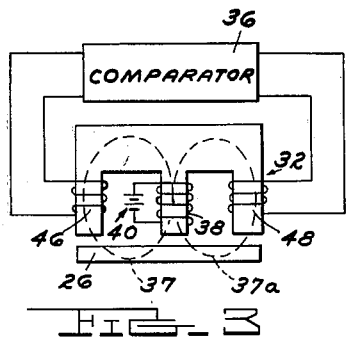
FIGURE 3 is a schematic representation of a differential transformer which is positioned in the auto of FIGURE 2 and which is in a center position over a strip in the lane.
Figure 4:
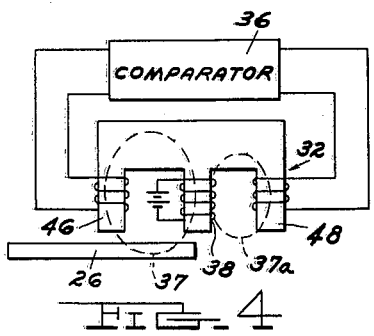
FIGURE 4 is a view similar to FIGURE 3 but wherein the differential transformer is not centered over the strip in a lane.

In FIGURE 2 is shown an automobile having at its front end differential transformer 32 shown in FIGURES 3 and 4, and at its rear end exciting means 34 also shown in FIGURE 5, with ferromagnetic strips 26 and elements 28 upon roadway 20. Differential transformer 32 senses the position of strips 26 and exciting means 34 is used to excite mechanically resonant elements 28.

The differential transformer 32 and comparator 36 used to provide and compare a pair of magnetic fields 37, 37a are shown in FIGURES 3 and 4 with the magnetic fields 37, 37a in FIGURE 3 being substantially equal, indicating transformer 32 is centered on a ferromagnetic strip 26, and with the magnetic fields 37, 37a in FIGURE 4 being unequal, indicating the transformer 32 is not centered over a ferromagnetic strip 26. Transformer 32 has an E shape with the center leg of the E being wound with a coil 38 having a D.C. excitation 40 which provides magnetic fields 37, 37a. The outer legs have sensing windings 46, 48 which are connected to comparator 36 which compares the relative strengths and frequencies of fields 37 and 37a and translates these into steerings and speed commands as will be discussed in connection with the schematic diagram of FIGURE 6. The path of magnetic field 37 goes through an outer leg of differential transformer and then back to the center leg. As a strip 26 passes beneath the transformer, a portion of the field will traverse the strip, reducing the reluctance and increasing said field strength. Of course, the strength of field 37 will vary with the length of strip 26 through which it passes since the reluctance of strip 26 is much less than that of air. In a similar manner the strength of field 37a will correspond to the length of strip 26 through which it passes. When the strip 26 is centered beneath transformer 32 the fields 37 and 37a will be substantially equal and the current induced in windings 46 and 48 due to relative motion between the transformer and the strips and the resultant change in field strength in the transformer, will be substantially equal, indicating that the vehicle is on course. However, if the vehicle strays off course, then the transformer 32 will not be centered over strip 26 and the fields and currents in the corresponding windings will become unequal, setting up a corrective signal to vehicle steering command. In FIGURE 4, field 37 is shown to be much larger than field 37a since its reluctance is lesser due to the fact that it passes through a considerably smaller air gap than does field 37a.

The proximity warning device 34 (FIGURE 5) comprises a three leg transformer 50 with each leg being wound with a coil from exciter 52 so that a very strong alternating magnetic field is produced. As mentioned, spaced along the roadway are a series of mechanically resonant devices 28 which are caused to undergo mechanical deformation when subject to the applied magnetic field. The elements 28 are shown placed in recesses 56 in the road 20 and when transformer 50 passes thereover are caused to vibrate. These vibrations will be proportional to the amount of time that transformer 50 is over elements 28 so that a slowly moving vehicle will impart greater vibrations. The vibrations attenuate in time so that when picked up by a following vehicle will give a signal which is proportional to the nearness and inversely proportional to the speed of the preceding vehicle. If the preceding vehicle is moving slowly the vibrations will be of greater amplitude, and if it has recently passed the elements 28 it will be less attenuated and, therefore, stronger. The vibrations impress a high frequency modulation on the magnetic fields of differential transformer 32.

A second embodiment of magnetostrictive elements is shown in FIGURE 5A where an element 28a is shown fixed at one end to a road insert 57 and is free to vibrate at the other end. When excited by exciter 34, the amplitude of vibration or periodic movement of the free end will be increased.

A further embodiment is shown in FIGURE 5b when magnetostrictive element 28b is supported on a non-magnetic pedestal 58 in a cup magnet 59. As element 28b is excited to periodic contraction and expansion, it varies the magnetic field between the north and south poles of the magnet 59 and these vibrations can be sensed by transformer 32.

The apparatus by which the signals generated by magnetic fields 37, 37a of transformer 32 are compared to control steering and speed, and the apparatus by which the high frequency vibration imparted by the magnetostrictive elements 28 actuate a warning system will now be described. In FIGURE 6 is a partially schematic, block diagram showing differential transformer 32 having winding 48 connected to an amplifier 62 which amplifies the signal modulated by strips 26 and any high frequency signal imparted by elements 34; a low pass filter 64 then removes the high frequency portion of the signal from amplifier 62; a peak detector 66 then produces a transient pulse at a repetition rate (frequency) proportional to the rate with which transformer 32 passes over strip 26, which triggers a pulse generator 68; a unidirectional pulse from generator 68 then goes through low pass filter 70 so that its D.C. component is fed to difference amplifier 72; a reference frequency 74 triggers a pulse generator 76 which goes through low pass filter 78 and also into difference amplifier 72. The reference frequency 74 corresponds to the desired number of strips 26 the vehicle is to pass over during a unit of time and any difference between this frequency and the frequency received from peak detector 66 will result in a signal from difference amplifier 72 to accelerator actuator 80. Therefore, if the frequency from generator 68 is less than the frequency from generator 76, actuator 80 will be supplied with a positive signal which will increase the vehicle speed until the frequencies of generators 68 and 76 coincide, at which time there will be a zero output from amplifier 72. It can be seen that the spacing of strips 26 will control the vehicle speed.

Winding 46 on transformer 32 is connected to an amplifier 82 which amplifies the relatively low frequency signal imparted by strips 26 and any impressed high frequency from magnetostrictive elements 28; low pass filter 84 removes the high frequency portion of the signal and passes the lower frequency portion to peak detector 86. The signals from detectors 66 and 86 are greatly stretched pulses proportional in amplitude to the signals generated in pick-up windings 48 and 46 respectively. These are passed to differential amplifier 88 and coincidence sensor 90. The amplitudes from detectors 66 and 86 are compared by amplifier 88 and any difference is sent to an amplifier 92 which controls steering actuator 94. Whenever transformer 32 comes out of alignment with strips 26, a difference signal will appear between detectors 66 and 86 and a self correcting signal is sent to actuator 94 to bring the vehicle and transformer back to alignment.

Also connected to amplifier 92 is a limit sensor 96 which disconnects the signal to actuator 94 and connects a failure alarm system by moving switches 98 and 100, respectively, to a downward position whenever the signal difference reaches a predetermined level. This indicates to the vehicle operator that the differential transformer 32 is so far out of alignment with strips 26 that steering actuator 94 might not be able to respond sufficiently to bring the vehicle back on course.

Coincidence sensor 90 is also a safety measure and opens switch 102 and closes switch 104, respectively, disconnecting the steering actuator and connecting failure alarm 101 whenever a signal is received from only one detector 66, 86 again warning the driver when the vehicle is about to leave the control system due to a system failure or adverse road conditions or other causes. Of course, failure alarm 101 could also be connected to steering and braking elements to bring the vehicle automatically to a safe stop near the road.

Connected to the outputs of amplifiers 62 and 82, respectively, are high pass filters 106 and 108 which pass only that portion of the signal which is caused by magnetostrictive elements 28. The signals from filters 106 and 108 are added and amplified by amplifier 110 and then sent to peak detector 112 which submits the signal to level sensor 114. If the added signals exceed a predetermined level the proximity warning device 160 is actuated, indicating that the vehicle in front is traveling at a speed which is dangerous for the distance that it precedes.

*Operation*

Briefly, the operation of the embodiment shown is as follows. A vehicle 30 which is equipped with an exciter transformer 32 in the front portion and a differential amplifier in the rear portion begins its journey on a lane 24 which has attached thereto a series of transversely aligned ferromagnetic strips 26 which are spaced according to the vehicle speed which is safe at any point along the road. If a transformer 32 is directly over and centered on the strips 26, then the magnetic fields 37, 37a will be substantially equal and equal signals will be generated in coils 46, 48, due to relative motion between the transformer and the strips and a changing magnetic field strength in the transformer resulting in a zero signal at amplifier 92, at which time no signal will be given to steering actuator 94. However, if transformer 32 is not aligned over the strips 26 then, in the case where the transformer is to one side of the strip 26 a negative signal will be sent to steering actuator 94, and in the case where the transformer is to the other side of strips 26, then a positive signal will be sent to actuator 94 with the absolute values of the signals corresponding to the degree which the transformer is off center from the strips 26.

The accelerator control is provided by comparing the frequency of pulses which are caused by transformer 32 going over ferromagnetic strip 26 with a frequency reference 74. If the frequency of pulses from generator 68, which is triggered by detector 66, is equal to the frequency of pulses from generator 76, which is triggered by reference 74, then a zero signal will go to accelerator actuator 80. If, however, the pulses from generator 68 are at a higher or lower repetition rate than the pulses from generator 76, then, respectively, a negative or positive signal will be sent to actuator 80 to bring the vehicle to the proper speed.

The vehicle 30 has an exciter amplifier 34a at its rear portion for energizing exciter 34 which excites magnetostrictive elements 28 which at regular intervals replace elements 26. Exciter 34 causes the elements 28 to vibrate and this vibration imparts a signal, which is relatively high in frequency as compared with the frequency at which the vehicle passes over strips 26. This high frequency signal passes filters 106 and 108, is added and amplified by amplifier 110, is smoothed by detector 112 and then is compared at level sensor 114 with a safe level reference and if it exceeds this reference, actuates proximity warning device 116.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Motor vehicle control system for use in conjunction wtih a road comprising individual magnetic members being in longitudinal alignment with at least one lane in the road, magnet means adapted for placement in the vehicle for sensing the position of said magnetic members relative said vehicle, means for indicating the relative position of said magnetic members and said vehicle and the number of magnetic members passed over by said vehicle in a given time period, means for controlling vehicle direction in accordance with the relative position of said magnetic members and said vehicle, and means for controlling vehicle speed in accordance with the number of magnetic members passed over in a given time, said magnet means comprising a differential transformer having means for supplying magnetic field lines to a plurality of free ends which return through a gaseous path to said magnet means, signal pick up means being placed adjacent each of said free ends for sensing the strength of the magnetic field in its respective end, means for receiving the signals from said pick up means, said magnetic members when in said gaseous path reducing and increasing the reluctance correspondingly in the respective ends in an amount indicative of the relative length of magnetic members in the said paths.

2. The system of claim 1 wherein said differential transformer is E-shaped with a coil energized by a direct current source being wound about the center leg of the E to form said magnet means, and a coil being wound about each of the outer legs to form said pick up means, said outer legs and center leg being in a line which is substantially transverse to the direction of travel of said vehicle.

3. The system of claim 2 wherein said magnetic members are spaced magnetic strips having their longitudinal axes parallel and transverse to the lane along which they are aligned.

4. The system of claim 3 wherein the spacing of said magnetic members is varied to control the speed of the vehicle.

5. Motor vehicle control system for use in conjunction with a road comprising individual magnetic members being in longitudinal alignment with at least one lane in the road, magnet means adapted for placement in the vehicle for sensing the position of said magnetic members relative said vehicle, means for indicating the relative position of said magnetic members and said vehicle and the number of magnetic members passed over by said vehicle in a given time period, means for controlling vehicle direction in accordance with the relative position of said magnetic members and said vehicle, and means for controlling vehicle speed in accordance with the number of magnetic members passed over in a given time, a magnetic member adapted for placement in a first vehicle and receiving means adapted for placement in a second vehicle, individual magnetically excited mechanically resonant means being spaced along said lane for receiving and retaining information from said first vehicle to pass to said second vehicle indicating the proximity of said vehicles.

6. The system of claim 5 wherein said mechanically resonant means comprises a ferromagnetic member fixed at one end and free to vibrate at the other end and said receiving means comprises a member for sensing the sonic vibrations of the vibrating magnetic member.

7. The system of claim 5 wherein said mechanically resonant means comprises a magnetostrictive member suspended in the field of a magnet, said receiving means comprises a member for sensing magnetic field variations.

8. The system of claim 2 having means to emit a warning signal and means to disconnect said vehicle steering control when no signal is received from one of said outer legs.

9. A proximity warning system for use in conjunction with a road comprising individual magnetostrictive mechanically resonant magnetic means being spaced along at least one lane of said road, a magnet member being in a first vehicle to cause said magnetostrictive members to resonate upon passage of said first vehicle magnet member thereover, magnet means in a second vehicle placed in a position to pass in close proximity with said magnetostrictive magnetic members as said second vehicle moves along said lane, at which time said second vehicle magnet means and said magnetostrictive magnetic members are magnetically coupled producing a magnetic signal in said second vehicle magnet means corresponding to the vibration characteristics of said magnetostrictive members, means in said second vehicle to translate said second vehicle magnetic signal to a warning of the proximity of said first vehicle.

References Cited in the file of this patent

UNITED STATES PATENTS

| | | |
|---|---|---|
| 1,575,579 | Howe | Mar. 2, 1926 |
| 1,728,563 | Grondahl | Sept. 17, 1929 |
| 2,074,251 | Braun | Mar. 16, 1937 |
| 2,493,755 | Ferrill | Jan. 10, 1950 |
| 2,576,424 | Sunstein | Nov. 27, 1951 |
| 2,719,911 | Maenpaa | Oct. 4, 1955 |
| 2,841,782 | McIlwain | July 1, 1958 |
| 3,009,525 | De Liban | Nov. 21, 1961 |

FOREIGN PATENTS

| | | |
|---|---|---|
| 779,462 | France | Jan. 14, 1935 |